US010635282B2

(12) United States Patent
Arnold et al.

(10) Patent No.: US 10,635,282 B2
(45) Date of Patent: Apr. 28, 2020

(54) METHOD AND APPARATUS FOR ASSISTING A DRIVER OF A VEHICLE, IN PARTICULAR OF A COMMERCIAL VEHICLE (71) Applicants: Claus Arnold, Sinzing (DE); Holger Mohra, Munich (DE)

(72) Inventors: Claus Arnold, Sinzing (DE); Holger Mohra, Munich (DE)

(73) Assignee: MAN Truck & Bus AG, Munich (DE)

(*) Notice: Subject to any disclaimer, the term of this patent is extended or adjusted under 35 U.S.C. 154(b) by 274 days.

(21) Appl. No.: 15/068,073

(22) Filed: Mar. 11, 2016

(65) Prior Publication Data
US 2016/0266786 A1 Sep. 15, 2016

(30) Foreign Application Priority Data

Mar. 12, 2015 (DE) .......... 10 2015 003 181

(51) Int. Cl.
G06F 3/0484 (2013.01)
H04W 4/02 (2018.01)
(Continued)

(52) U.S. Cl.
CPC .......... *G06F 3/04847* (2013.01); *B60K 37/06* (2013.01); *G06F 3/0482* (2013.01); *H04M 1/72572* (2013.01); *H04W 4/02* (2013.01); *H04W 4/023* (2013.01); *H04W 4/029* (2018.02); *H04W 4/80* (2018.02); *B60K 2370/197* (2019.05); *B60K 2370/573* (2019.05); *B60K 2370/5911* (2019.05)

(58) Field of Classification Search
CPC .... G06F 3/04847; G06F 3/0482; H04W 4/80; H04W 4/023; G05D 1/0016
See application file for complete search history.

(56) References Cited

U.S. PATENT DOCUMENTS 6,259,362 B1 * 7/2001 Lin .......................... B60Q 9/00
307/10.1
8,326,259 B2    12/2012 Gautama et al.
(Continued)

FOREIGN PATENT DOCUMENTS

CN    101484779    7/2009
CN    202186347 U   4/2012
(Continued)

OTHER PUBLICATIONS

Search Report dated Sep. 1, 2016 which issued in the corresponding European Patent Application No. 16000450.3.
(Continued)

*Primary Examiner* — Tadesse Hailu
*Assistant Examiner* — Roberto Borja
(74) *Attorney, Agent, or Firm* — Cozen O'Connor (57) ABSTRACT A method for assisting a driver of a vehicle includes: establishing a signal transfer connection between a mobile display device and a position determination device of the vehicle; determining, based on the signal transfer connection, the position of the mobile display device relative to the vehicle; and displaying, by the mobile display device, based upon the determined position, at least one item of vehicle information and/or at least one operating menu for remote control of at least one vehicle function.

14 Claims, 6 Drawing Sheets (51) Int. Cl.
*H04W 4/80* (2018.01)
*B60K 37/06* (2006.01)
*H04W 4/029* (2018.01)
*H04M 1/725* (2006.01)
*G05D 1/00* (2006.01)
*G06F 3/0482* (2013.01)

(56) References Cited

U.S. PATENT DOCUMENTS

| | | | |
|---|---|---|---|
| 9,085,268 B1* | 7/2015 | Clement | B60W 10/18 |
| 2007/0279241 A1* | 12/2007 | Jung | H04M 1/7253 |
| | | | 340/691.6 |
| 2009/0113961 A1* | 5/2009 | Muller | B60R 25/2009 |
| | | | 70/256 |
| 2010/0066920 A1* | 3/2010 | Kwak | G06F 3/04886 |
| | | | 348/734 |
| 2014/0005859 A1* | 1/2014 | Baskin | G07C 9/00309 |
| | | | 701/2 |
| 2014/0163809 A1* | 6/2014 | Basir | B60R 16/0373 |
| | | | 701/31.5 |
| 2015/0341901 A1* | 11/2015 | Ryu | H04M 1/72569 |
| | | | 455/458 |
| 2017/0151928 A1* | 6/2017 | Kang | B60R 25/01 |

FOREIGN PATENT DOCUMENTS

| | | | |
|---|---|---|---|
| CN | 103125079 | 5/2013 | |
| DE | 10 2013 021 594 | 8/2014 | |
| DE | 102013021594 A1 * | 8/2014 | ............ H04W 4/008 |
| KR | 20120120807 | 11/2012 | |
| KR | 20130131956 | 12/2013 | |
| RU | 2012128270 | 1/2014 | |

OTHER PUBLICATIONS

Office Action dated Nov. 4, 2019 issued in Chinese Patent Application No. 201610138291.X.
Office Action dated Aug. 27, 2019 issued in Russian Patent Application No. 2016108643/11.

* cited by examiner

METHOD AND APPARATUS FOR ASSISTING A DRIVER OF A VEHICLE, IN PARTICULAR OF A COMMERCIAL VEHICLE

BACKGROUND OF THE INVENTION

1. Field of the Invention

The invention relates to a method for assisting a driver of a vehicle, in particular of a commercial vehicle, an apparatus for assisting a driver of a vehicle, in particular of a commercial vehicle, as well as a vehicle, in particular a commercial vehicle, for performing the method and/or with the apparatus.

2. Description of the Related Art

In It is known to couple a mobile device, for example, a smartphone, to a vehicle, in particular to a commercial vehicle, such that vehicle information is displayed on a display screen of the mobile device. In this way a driver of the vehicle can, for example, be informed about the current state of the vehicle if he is located outside of the vehicle. Such vehicle information can, for example, be a current location of the vehicle or information about the state of vehicle tires or the vehicle lighting. It is also known that vehicle functions can be remotely operated or remotely controlled by the functions is usually displayed on the mobile device, by which the driver can operate or control the vehicle functions from outside of the vehicle. Such vehicle functions can, for example, be a control function for a vehicle air conditioning system or a control function for a vehicle lighting system. Mobile apps or mobile application software are usually provided for displaying the vehicle information and/or for remote control of the vehicle functions, and can be installed in the mobile device if required.

Because a large number of apps, vehicle information that can be displayed and vehicle functions that can be operated remotely, are frequently provided on a mobile device, it is frequently difficult for a driver of the vehicle to quickly find the vehicle information currently or situationally relevant for him and/or the correct operating menu for remote control of a defined vehicle function. Frequently the search for the desired information or function is even fruitless.

SUMMARY OF THE INVENTION

It is therefore an object of the invention to provide a method and an apparatus for assisting a driver of a vehicle, in particular of a commercial vehicle, by which the search for defined vehicle information and/or defined operating menus for the remote control of vehicle functions is simplified for the driver.

According to one aspect of the present invention, a method for assisting a driver of a vehicle, in particular of a commercial vehicle, is proposed, wherein a mobile display device, in particular a display screen, is provided, by which at least one item of vehicle information and/or at least one operating menu for remote control of at least one vehicle function can be displayed to the driver. According to this aspect of the invention, the display device has a signal transfer connection to a position determination device, by which the position of the display device relative to the vehicle can be determined. Depending on the determined position, at least one item of vehicle information and/or at least one operating menu for the remote control of at least one vehicle function is then displayed by the display device.

In this way the search for defined vehicle information and/or operating menus is significantly simplified; because the vehicle information and/or operating menus currently relevant for the driver are now displayed by the display device depending on the determined position of the mobile display device and hence also the position of the user of the mobile display device, for example, of the driver of the vehicle. The display for this can be carried out for example by so-called pop-ups or by visually highlighting the relevant vehicle information and/or the operating menus. The non-relevant vehicle information and/or operating menus are then not displayed or highlighted by the display device. Thus the driver only has to search through the vehicle information and/or operating menus that have already been pre-filtered regarding his current position in order to get to the desired vehicle information and/or operating menus.

The term mobile display device is to be understood to mean that the display device can be carried by or transported with the driver. It is preferable if the mobile display device is of such a compact form that the driver can attach or fix it to his clothing.

In a preferred procedure, the distance of the display device relative to the vehicle is determined by the position determination device. Depending on the determined distance of the display device, at least one item of vehicle information and/or at least one operating menu for remote control of at least one vehicle function is then displayed by the display device. The distance of the display device relative to the vehicle can be determined particularly simply and with high accuracy by the position determination device.

Specifically, the position determination device can comprise at least one transmitting device associated with the vehicle, by which a position signal can be output. The position determination device also comprises a receiving device associated with the display device, by which the at least one position signal can be received. In addition, the position determination device also comprises a data processing device associated with the display device, by which the position of the display device relative to the vehicle is determined from the at least one received position signal. In this way the position of the display device relative to the vehicle can be determined simply and reliably.

The position signal can, for example, be formed by a radio signal or by a WLAN signal and/or by a GPS signal for this. However, it is preferable if the position signal is in the form of a BLUETOOTH® signal, because this type of signal permits the position of the display device to be determined with particularly high accuracy. In addition, BLUETOOTH® technology is also particularly energy-saving, so that it is particularly advantageous for position determination with a mobile device. The advantages of modern BLUETOOTH® technologies are discussed further below:

Since BLUETOOTH® Version 4.0, "BLUETOOTH® Low Enemy" or "BLUETOOTH® Smart" is a part of the BLUETOOTH® standard. It enables basic communications between BLUETOOTH® devices without a preceding coupling process. Such basic communications are particularly energy-saving and can be used for determining the distance between BLUETOOTH® Smart enabled devices. The distance of a BLUETOOTH® Smart enabled device, for example, of a smartphone as a display device, from another defined object, for example, the vehicle, can be carried out by so-called "BLUETOOTH® Beacons" that are associated with the defined object. The BLUETOOTH® Smart enabled device is capable of searching for the BLUETOOTH® Beacons and, using the signal strengths of a beacon signal, to determine a distance between the BLUETOOTH® Smart enabled device and the beacon to an accuracy of a few centimeters in a range from approx. 5 cm to 70 m around the beacon. If at least three beacons with intersecting transmission radii are used, the position of the BLUETOOTH® Smart enabled device relative to the beacons can be determined with high accuracy by triangulation.

In one preferred embodiment, the display device further comprises at least one mobile actuating device operated by the driver of the vehicle, in particular a button and/or a switch, by the operation of which the at least one operating menu can be operated. The at least one operating menu can thus be operated simply and reliably. It is preferable if the at least one actuating device is formed by the display device comprising a touchscreen.

Specifically, the display device can be formed by a mobile device, in particular by a smartphone and/or by a tablet PC. By making the display device from such a commercial mobile device, the remote control of the at least one vehicle function can be achieved in a particularly inexpensive way.

It is preferable if a signal transmission device is provided, by which at least one remote control signal, in particular in the form of a WLAN signal and/or of a radio signal and/or of a BLUETOOTH® signal, is transmitted from the display device to the vehicle and/or at least one vehicle information signal, in particular in the form of a WLAN signal and/or of a radio signal and/or of a BLUETOOTH® signal, is transmitted from the vehicle to the display device. The WLAN signal or the radio signal are particularly advantageous for this, because the same comprise a particularly long range. The BLUETOOTH® signal is above all suitable for signal transmission if the display device is located within a defined close proximity in the vicinity of the vehicle.

If the receiving device is located outside the range of the position signal and thus does not receive the position signal, it is preferable that at least one item of remote vehicle information and/or at least one operating menu for remote control of at least one remote vehicle function is displayed by the display device. In this way, outside the range of the position signal only the vehicle information and/or operating menus that are relevant in this case are displayed by the display device.

The remote vehicle information is preferably formed by at least one general item of vehicle information and/or by the current air pressure of at least one vehicle tire and/or by the current location of the vehicle and/or by at least one item of instrument panel information. The vehicle information is particularly of interest if the display device is located outside the range of the position signal. The at least one item of general vehicle information can, for example, be formed by the current level of a vehicle liquid, for example fuel, AdBlue, windscreen washer water, engine coolant or engine oil, and/or by an error memory entry, for example because of a defective sensor, of a dirty air filter, a defective light bulb or an inspection being due, and/or by the current condition of the brake linings and/or by the current mileage. In addition, the at least one item of general vehicle information can, for example, also be in the form of stored vehicle trip data, such as, for example, kilometers travelled for the last trip, average consumption, consumption statistics, time duration of the last trip, and/or by data of a digital tachograph stored in the vehicle, such as for example, remaining driving time, required pause time, required resting time, and/or by information about the vehicle structure, such as for example, the interior temperature of the refrigerated container structure.

More preferably, the at least one remotely controlled remote vehicle function is in the form of the regulation and/or control of the vehicle heating and/or of the vehicle air conditioning system. The regulation and/or control function is also relevant if the display device is located outside the range of the position signal. Furthermore, the at least one remotely controlled remote vehicle function can, for example, also be in the form the regulation and/or control of at least one external camera installed on the vehicle for monitoring the vehicle surroundings and/or of the regulation and/or control of at least one structure-specific function, for example, the regulation and/or control of the interior temperature of a refrigerated container structure.

It is further preferable, if the receiving device is located within the range of the position signal and thus receives the position signal, that at least one item of near vehicle information and/or at least one operating menu for remote control of at least one near vehicle function is/are displayed by the display device. It is preferably provided for this that the at least one item of near vehicle information is in the form of at least one item of general vehicle information.

It is preferable, if the receiving device moves from an outer region outside the range of the position signal into an inner region within the range of the position signal, that at least one item of near vehicle information and/or at least one operating menu for remote control of at least one near vehicle function is displayed by the display device. In this way the at least one item of near vehicle information and/or the at least one operating menu for remote control of at least one near vehicle function are displayed particularly early. It is preferably provided for this that when displaying at least one defined item of near vehicle information and/or at least one defined operating menu for remote control of at least one near vehicle function, an information signal, in particular an audible signal, is output to the driver by a signal output device that is associated with the display device. Using such an information signal the driver can reliably be informed that relevant near vehicle information and/or relevant operating menus are now displayed or are now available by the display device. In this way the driver can, for example, be reminded about performing a departure check as a relevant item of near vehicle information.

If the receiving device is located outside the vehicle, the near vehicle function is preferably in the form of an extra-vehicle function, wherein it is preferably provided that the at least one remotely controlled extra-vehicle function is in the form of the control and/or regulation of external vehicle lighting and/or checking the vehicle lighting and/or locking and/or unlocking of the vehicle.

If the receiving device is located within the vehicle, the near vehicle function is preferably in the form of an intra-vehicle function, wherein it is preferably provided that the at least one remotely controlled intra-vehicle function is in the form of the control and/or regulation of an infotainment system of the vehicle and/or of the control and/or regulation of the vehicle heating and/or the vehicle air conditioning system and/or of the control and/or regulation of internal vehicle lighting and/or of the locking and/or unlocking of the vehicle. Furthermore, the at least one remotely controlled intra-vehicle function can, for example, also be in the form of the control and/or regulation of a vehicle sliding roof and/or at least one vehicle window and/or at least one vehicle sunblind and/or a level compensation device of the vehicle.

Further preferably, a blocking device is provided, by which the remote control of at least one vehicle function can be blocked depending on the determined position of the display device. In this way, depending on the determined position of the display device only those vehicle functions are remotely operated or remotely controlled for which remote control is currently useful or harmless. It is preferably provided for this that the remote control of at least one vehicle function, in particular the remote control of all vehicle functions, is blocked by the blocking device if the display device is located in a seating position in a defined region within the vicinity of the driver's seat. As a result, for example, the distraction of the driver by the remote control function is prevented if the driver is located on the driver's seat. It is preferably provided for this that if the display device is located in the seating position and if the vehicle is moving, the remote control of the at least one vehicle function is blocked by the blocking device. In this way it is ensured that the remote control of the at least one vehicle function is only blocked if the vehicle is travelling. It is further preferable, if the at least one vehicle function is blocked by the blocking device, that the signal transmission between the vehicle and the display device is still at least partly enabled. As a result, data stored for example in the display device is still at least partly enabled. As a result, data stored for example in the display device, for example music data or telephone contact data, is still transmitted to the vehicle.

It is preferable, if the display device is located in at least one defined position relative to the vehicle during a vehicle loading and/or unloading process, that at least one item of loading and/or unloading vehicle information and/or at least one operating menu for remote control of a loading and/or unloading vehicle function is displayed by the display device. In this way the driver can find the at least one item of loading and/or unloading vehicle information or the at least one operating menu for remote control of the loading and/or unloading vehicle function particularly rapidly if he requires the information or the operating menu. The information that the vehicle is in a loading and/or unloading process can be transmitted to the display device, for example by an external information device. It would however also be conceivable that the driver notifies the display device of a vehicle loading and/or unloading process.

The at least one item of loading and/or unloading vehicle information can, for example, be in the form of at least one defined item of maintenance and/or logistical and/or load information, for example, of the load securing means to be used or of a hazardous goods notice. The remotely controlled loading and/or unloading vehicle function can, for example be in the form of the control and/or regulation of a tank assembly, of a loading and/or unloading device of the vehicle, of a tail lift of the vehicle, of a pneumatic suspension of the vehicle or of a drive device of the vehicle for driving a compressor/auxiliary unit.

In order to achieve the aforementioned object, an apparatus for assisting a driver of a vehicle, in particular of a commercial vehicle, is also proposed, wherein a mobile display device, in particular a display screen, is provided, by which at least one item of vehicle information and/or at least one operating menu for remote control of at least one vehicle function can be displayed to the driver. According to the invention, the display device has a signal transfer connection to a position determination device, by which the position of the display device relative to the vehicle can be determined. At least one item of vehicle information and/or at least one operating menu for remote control of at least one vehicle function can be displayed by the display device or not, depending on the determined position.

The advantages arising from the apparatus according to the invention are identical with the already mentioned advantages of the method according to the invention, so that the same are not repeated at this point.

Furthermore, a vehicle, in particular a commercial vehicle, for performing the method according to the invention and/or with the apparatus according to the invention is also proposed. The resulting advantages are identical with the advantages of the method according to the invention and the apparatus according to the invention, so that these too are not repeated here.

The embodiments and/or developments of the invention described above and/or in the dependent claims can be used on their own or even in any combination with each other—apart from in cases of clear dependencies or incompatible alternatives for example.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention and its advantageous embodiments and/or developments as well as the advantages thereof are described in detail below using figures only by way of example.

In the figures.

DETAILED DESCRIPTION OF THE PRESENTLY PREFERRED EMBODIMENTS

Figure 1:
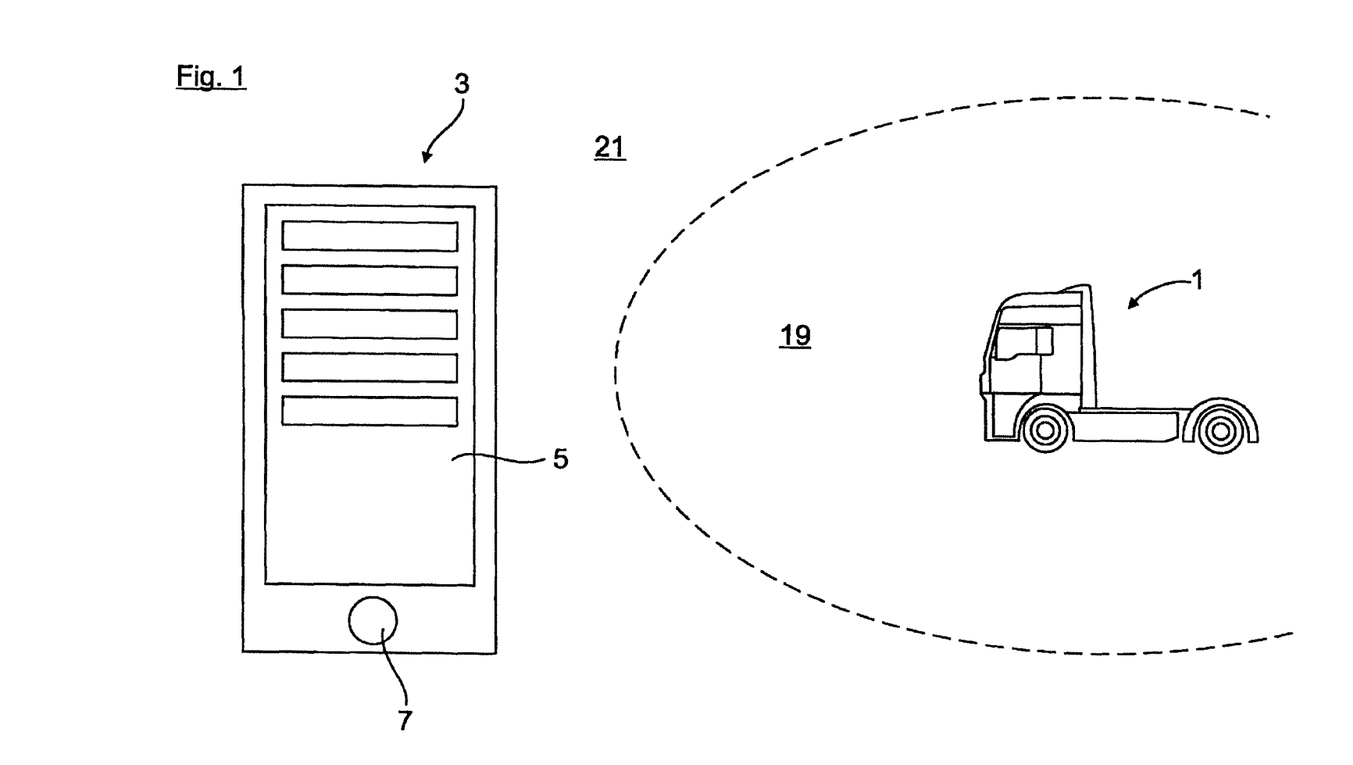
FIG. 1 shows in a schematic illustration a mobile device in a first position relative to a truck.

In FIG. 1 a vehicle, here, by way of example, in the form of a truck 1, and a mobile device 3 are shown. The mobile device 3 comprises a display device, here, by way of example in the form of a display screen 5 (see FIG. 2), by which both a plurality of vehicle information and also a plurality of operating menus for remote control of vehicle functions can be displayed to a driver of the truck 1. The operating menus can, for example, be operated by the display screen 5 in the form of a touchscreen and by a button 7 (see FIG. 2). It would, however, also be conceivable, for example, to provide other types of actuating devices for using the operating menus on the mobile device 3.

The mobile device 3 is, here by way of example, a conventional smartphone, on which a mobile app or application software is provided, by which the vehicle information can be displayed and the vehicle functions can be remotely operated. As an alternative to a conventional smartphone, the mobile device 3 could, for example, also be in the form of a conventional tablet PC or of another device that can be carried by the driver of the truck 1. In particular, the mobile device 3 could, for example, also be in the form of a vehicle remote control and/or vehicle information device specifically developed for the driver of the truck 1.

In order to facilitate operation of the mobile app or the application software for the driver of the truck 1, a position determination device 9 (FIG. 2) is provided, by which the position at the mobile device 3 relative to the truck 1 can be determined. At least one item of vehicle information and/or at least one operating menu for remote control of at least one vehicle function is displayed or not by the display screen 5 of the mobile device 3 depending on the determined position. In this way particularly relevant vehicle information and operating menus can be displayed to the driver of the truck 1 depending on his current position if he has activated the mobile app or the application software. Owing to the amount of vehicle information and operating menus, this significantly facilitates the search for the desired vehicle information and/or for the desired operating menu.

Figure 2:
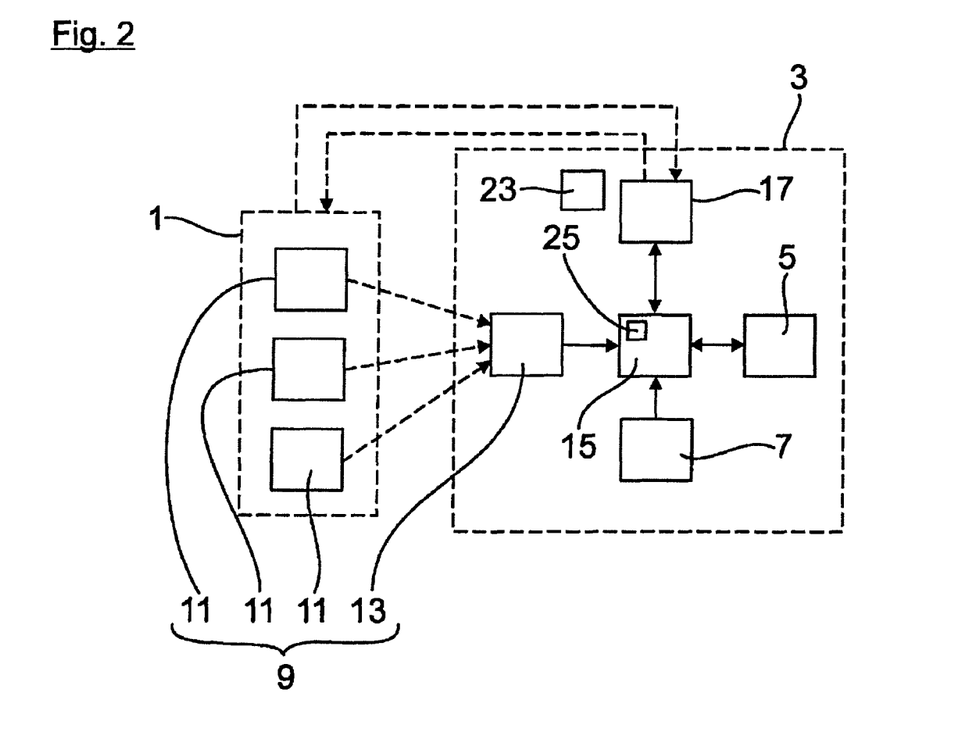
FIG. 2 shows a diagram, by which the design of the apparatus according to the invention is described.
Figure 3:
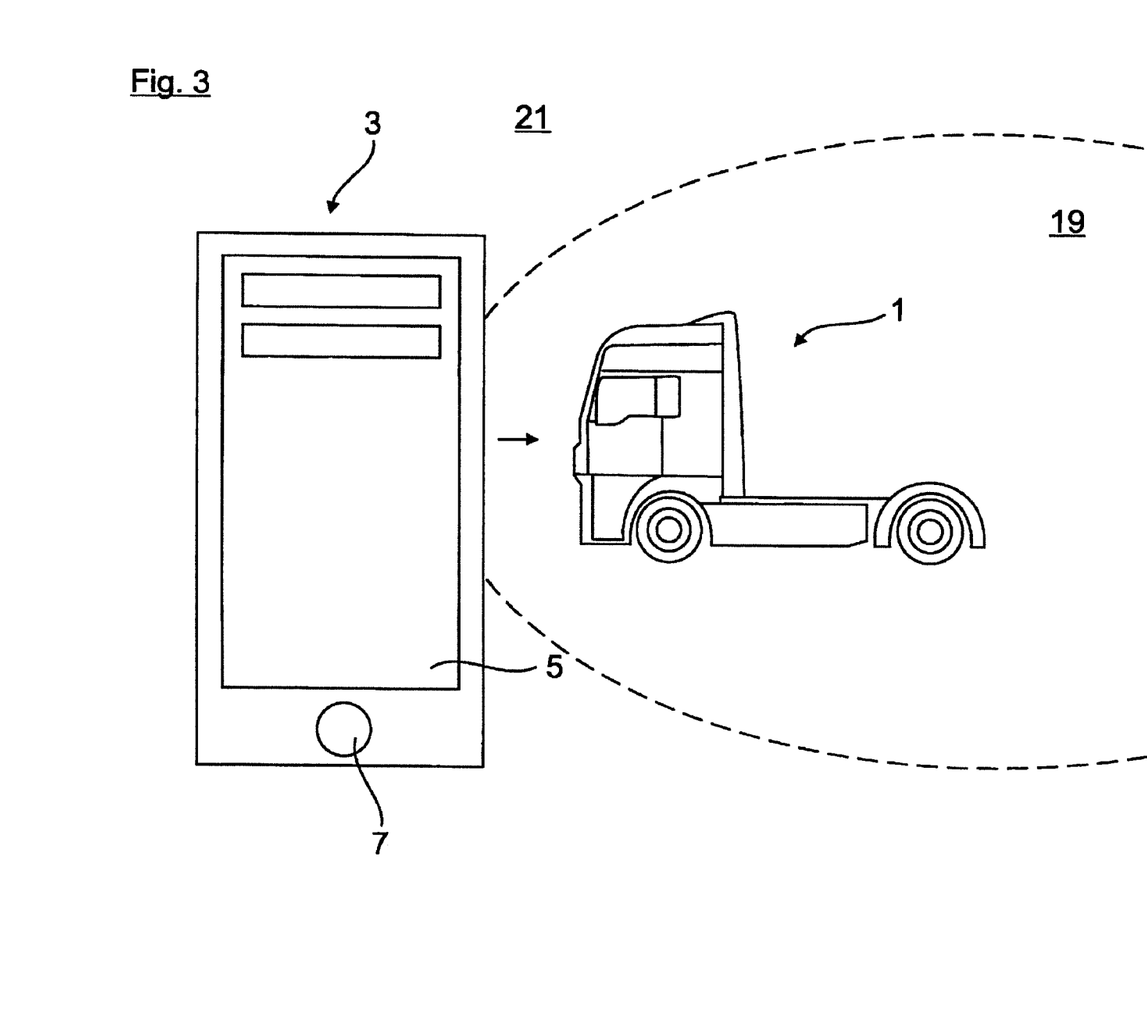
FIG. 3 shows the mobile device in a second position relative to the truck in an illustration according to FIG. 1.

As shown in FIG. 2, the position determination device 9 comprises, for example, three transmitting devices 11 associated with the truck 1, by which position signals can be output. The transmitting devices 11 are, for example, in the form of so-called BLUETOOTH® Beacons, by which a position signal in the form of a BLUETOOTH® signal is output. According to FIG. 2, the position determination device 9 also comprises a receiving device 13 associated with the mobile device 3, by which the position signals are received. In addition the position determination device 9 also comprises a data processing device 15 that is associated with the mobile device 3, by which the position of the mobile device 3 relative to the truck 1 can be determined from the received position signals.

The data processing device 15 also has a signaling connection to the display screen 5 of the mobile device 3 such that the display of the display screen 5 can be controlled or regulated by the data processing device 15. The data processing device 15 thus also forms a regulating and/or control device. In addition, the display screen 5 and the button 7 of the mobile device 3, for example, have signaling connections to the the display screen 5, for example. At the same time an audible information signal is also output by a signal output device 23 of the mobile device 3, by which the driver of the truck 1 s advised on the display of the operating menu to check the vehicle lighting.

Figure 4:
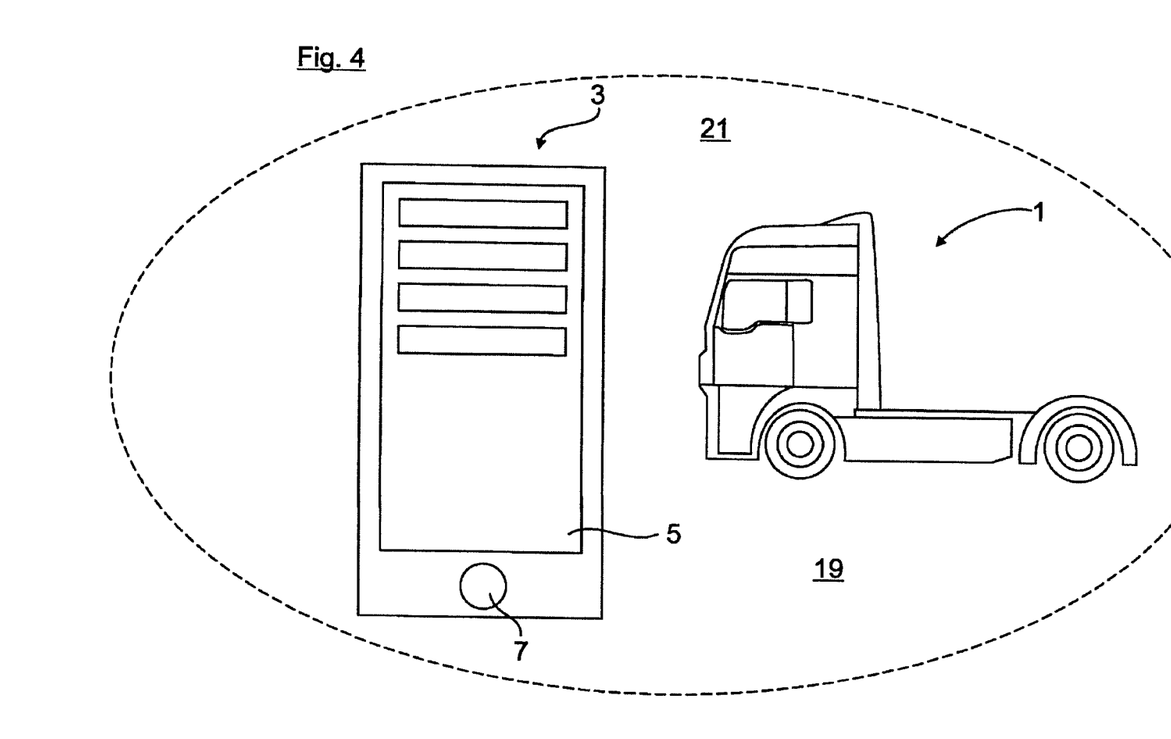
FIG. 4 shows the mobile device in a third position relative to the truck in an illustration according to FIG. 1.
Figure 5:
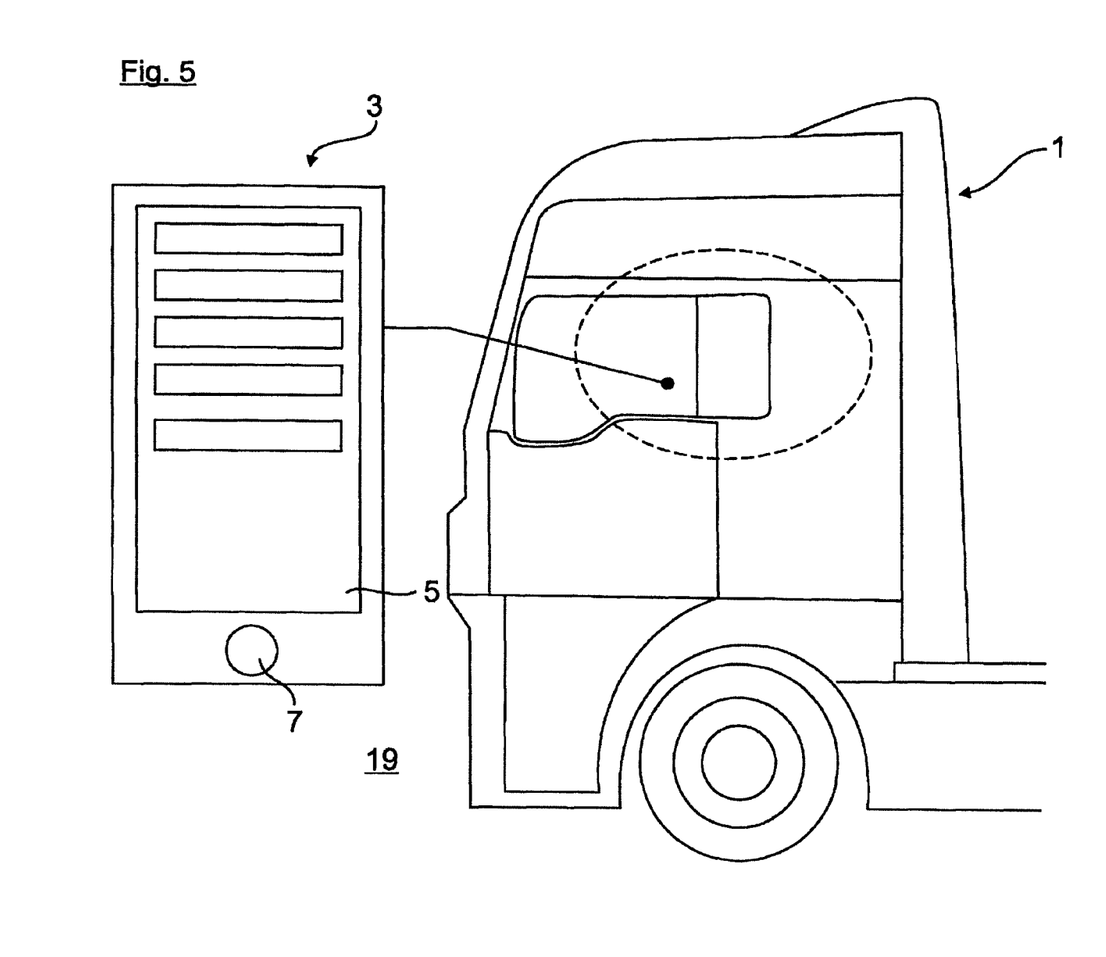
FIG. 5 shows the mobile device in a fourth position relative to the truck in an illustration according to FIG. 1.

Furthermore, if the mobile device according to FIG. 4 is located within range of the position signals or in the reception region 19, general vehicle information is displayed by the display screen 5 of the mobile device 3. If the mobile device 3 according to FIG. 4 is located outside of the vehicle, an operating menu for the control and/or regulation of vehicle external illumination, an operating menu for checking the vehicle lighting and an operating menu for locking and unlocking the truck 1 are displayed by the display screen 5 of the mobile device 3, for example. If the mobile device 3 according to FIG. 5 is located within the truck 1, an operating menu for the control and/or regulation of an infotainment system of the vehicle, an operating menu for the control and/or regulation of vehicle heating and of a vehicle air conditioning system, an operating menu for the control and/or regulation of interior vehicle lighting and an operating menu for locking and unlocking the truck 1 are displayed by the display screen 5 of the mobile device 3.

Figure 6:
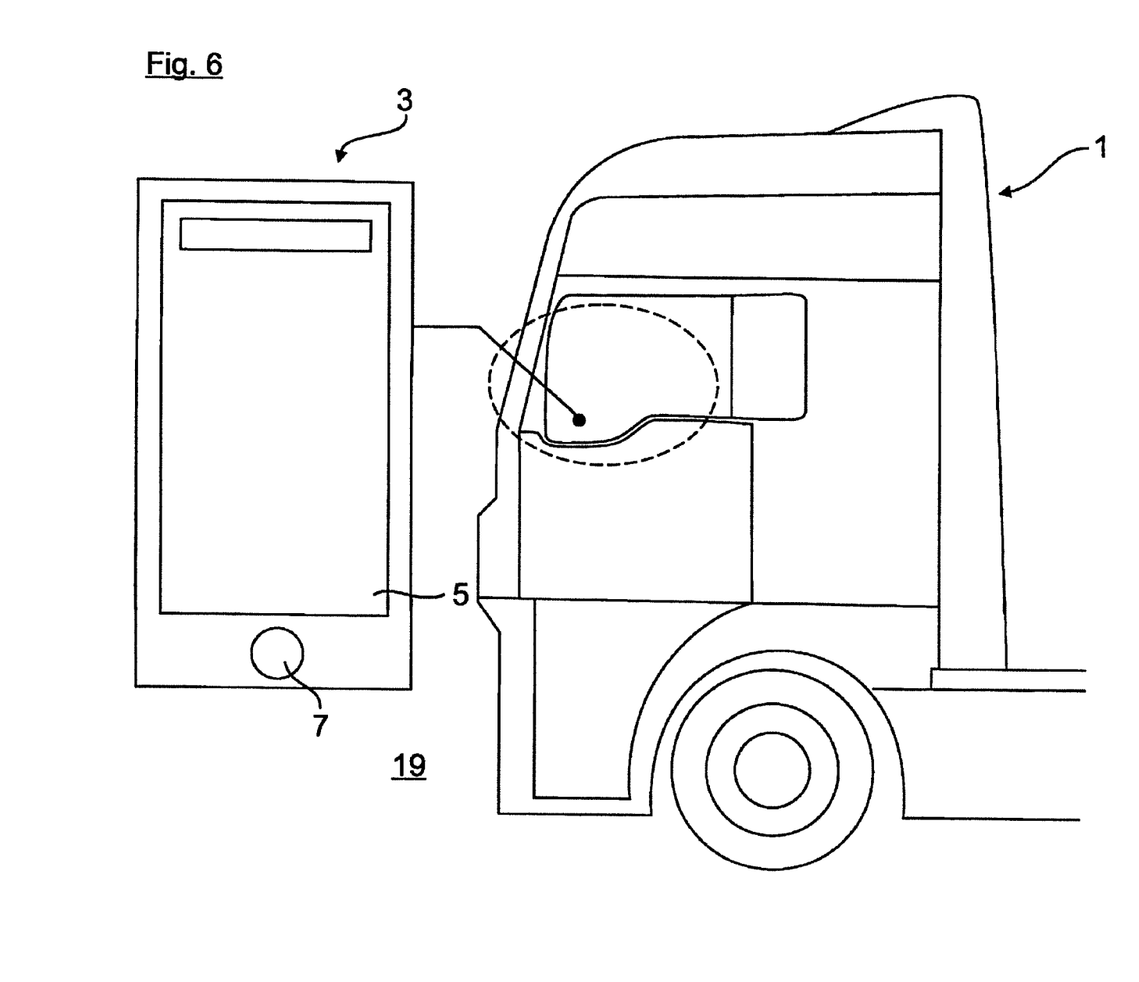
FIG. 6 shows the mobile device in a fifth position relative to the truck in an illustration according to FIG. 1.

Furthermore, if the mobile device 3 according to FIG. 6 is located in a seating position within a defined proximity in the vicinity of the driver's seat, for example, the operation of all operating menus for remote control of vehicle functions is blocked by a blocking device 25 (FIG. 2).

In addition, for example, if the mobile device 3 is located in a defined position relative to the truck 1 during a truck 1 loading and/or unloading process, at least one item of loading and/or unloading vehicle information and/or at least one operating menu for remote control of a loading and/or unloading vehicle function is displayed by the mobile device 3.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for assisting a driver of a vehicle using a mobile display device (3) having a display screen, by which display screen at least one item of vehicle information and at least one operating menu for remote control of at least one vehicle function is displayable to the driver, the method comprising:
    establishing a signal transfer connection between the mobile display device (3) and a position determination device (9) of the vehicle (1);
    determining, based on the signal transfer connection, a position of the mobile display device (3) relative to the vehicle (1); and
    displaying, by the mobile display device (3), based upon the determined position, at least one item of vehicle information and at least one operating menu for remote control of at least one vehicle function,
    wherein the position determination device (9) has at least three transmitters (11), associated with the vehicle (1), configured to output position signals, the position determination device (9) including a receiver (13) associated with the mobile display device (3), the receiver (13) being configured to receive the position signals, and the position determination device (9) including a data processor (15) associated with the mobile display device (3), the method further comprising:
    determining, by the data processor (15), the position of the mobile display device (3) relative to the vehicle (1) based on the received position signals by triangulation;
    if the receiver (13) moves from an outer region (21) outside a range of the position signals into an inner region (19) within the range of the position signals, displaying, by the mobile display device (3), at least one item of near vehicle information and the at least one operating menu for remote control of at least one near vehicle function;
    when displaying a defined item of near vehicle information and a defined operating menu for remote control of at least one near vehicle function, at the same time outputting an audible information signal to the driver by an audio transducer associated with the mobile display device (3) so that, by the audible information signal, the driver is reliably informed that relevant near vehicle information and relevant operating menus are now displayed by the display screen;

remotely controlling the at least one vehicle function based on a selection by the driver from the at least one operating menu for remote control;

depending on the determined position of the mobile display device (3), blocking remote control of at least one vehicle function; and if the mobile display device (3) is located in a seating position within a defined proximity in a vicinity of the driver's seat, blocking the remote control of at least one vehicle function.

2. The method according to claim 1, further comprising:
determining, by the position determination device (9), a distance of the mobile display device (3) relative to the vehicle (1); and depending on the determined distance of the mobile display device (3), displaying, by the mobile display device (3), at least one item of vehicle information and at least one operating menu for remote control of at least one vehicle function.

3. The method according to claim 1, wherein the mobile display device (3) has at least one mobile actuating device (5, 7), configured as a button and/or a switch, operable by the driver of the vehicle and through the actuation of which the at least one operating menu is operated.

4. The method according to claim 1, wherein the mobile display device (3) comprises a mobile device in the form of a smartphone and/or a tablet PC.

5. The method according to claim 1, wherein the mobile display device (3) has a transceiver (17), the method further comprising:
the transceiver (17) transmitting at least one remote control signal in the form of a WLAN signal and/or a radio signal and/or a BLUETOOTH® signal, from the mobile display device (3) to the vehicle (1); and/or transmitting at least one vehicle information signal, in the form of a WLAN signal and/or a radio signal and/or a BLUETOOTH® signal, from the vehicle (1) to the mobile display device (3).

6. The method according to claim 1, further comprising:
if the receiver (13) is located outside the range of the position signals and thus does not receive the position signals, displaying, by the mobile display device (3), at least one item of remote vehicle information and at least one operating menu for remote control of at least one remote vehicle function.

7. The method according to claim 6, wherein:
the at least one item of remote vehicle information includes at least one item of general vehicle information and/or a current air pressure of at least one vehicle tire and/or a current location of the vehicle (1) and/or at least one item of instrument panel information, and the at least one remote vehicle function includes a regulation and/or control function of a vehicle heating system and/or of a vehicle air conditioning system.

8. The method according to claim 7, further comprising:
if the receiver (13) is located within the range of the position signals and thus receives the position signals, displaying, by the mobile display device (3), the at least one item of near vehicle information and the at least one operating menu for remote control of at least one near vehicle function, the at least one item of near vehicle information including at least one item of general vehicle information.

9. The method according to claim 8, wherein, if the receiver (13) is located outside the vehicle (1), the near vehicle function has an extra-vehicle function, wherein the extra-vehicle function includes a function for control and/or regulation of vehicle external lighting and/or for checking vehicle lighting and/or for locking and/or unlocking the vehicle (1).

10. The method according to claim 8, wherein, if the receiver (13) is located within the vehicle (1), the near vehicle function has an intra-vehicle function, wherein the intra-vehicle function includes a function for control and/or regulation of an infotainment system of the vehicle (1) and/or a function for the control and/or regulation of a vehicle heating system and/or of a vehicle air conditioning system and/or a function for the control and/or regulation of vehicle interior lighting and/or a function for locking and/or unlocking the vehicle (1).

11. A method for assisting a driver of a vehicle using a mobile display device (3) having a display screen, by which display screen at least one item of vehicle information and at least one operating menu for remote control of at least one vehicle function is displayable to the driver, the method comprising:

establishing a signal transfer connection between the mobile display device (3) and a position determination device (9) of the vehicle (1);

determining, based on the signal transfer connection, a position of the mobile display device (3) relative to the vehicle (1); and displaying, by the mobile display device (3), based upon the determined position, at least one item of vehicle information and at least one operating menu for remote control of at least one vehicle function, wherein the position determination device (9) has at least three transmitters (11), associated with the vehicle (1), configured to output position signals, the position determination device (9) including a receiver (13) associated with the mobile display device (3), the receiver (13) being configured to receive the position signals, and the position determination device (9) including a data processor (15) associated with the mobile display device (3), the method further comprising:

determining, by the data processor (15), the position of the mobile display device (3) relative to the vehicle (1) based on the received position signals by triangulation;

if the receiver (13) moves from an outer region (21) outside a range of the position signals into an inner region (19) within the range of the position signals, displaying, by the mobile display device (3), at least one item of near vehicle information and the at least one operating menu for remote control of at least one near vehicle function;

when displaying a defined item of near vehicle information and a defined operating menu for remote control of at least one near vehicle function, at the same time outputting an audible information signal to the driver by an audio transducer associated with the mobile display device (3) so that, by the audible information signal, the driver is reliably informed that relevant near vehicle information and relevant operating menus are now displayed by the display screen;

remotely controlling the at least one vehicle function based on a selection by the driver from the at least one operating menu for remote control; and if the mobile display device (3) is located in at least one defined position relative to the vehicle (1) during a vehicle (1) loading and/or unloading process, displaying, by the mobile display device (3), at least one item of loading and/or unloading vehicle information and/or at least one operating menu for remote control of at least one loading and/or unloading vehicle function.

12. An apparatus for assisting a driver of a vehicle, comprising: a mobile display device (3) having a display screen, by which at least one item of vehicle information and at least one operating menu for remote control of at least one vehicle function is displayable to the driver,
  wherein
  the mobile display device (3) has a signal transfer connection to a position determination device (9), by which a position of the mobile display device (3) relative to the vehicle (1) can be determined, and
  at least one item of vehicle information and at least one operating menu for remote control of at least one vehicle function is displayable by the mobile display device (3) depending on the determined position,
  wherein the position determination device (9) has at least three transmitters (11), associated with the vehicle (1), configured to output position signals, the position determination device (9) including a receiver (13) associated with the mobile display device (3), the receiver (13) being configured to receive the position signals, and the position determination device (9) including a data processor (15) associated with the mobile display device (3),
  the data processor (15) being configured to determine the position of the mobile display device (3) relative to the vehicle (1) based on the received position signals by triangulation;
  the mobile display device (3) being configured to display, if the receiver (13) moves from an outer region (21) outside a range of the position signals into an inner region (19) within the range of the position signals, at least one item of near vehicle information and the at least one operating menu for remote control of at least one near vehicle function;
  an audio transducer associated with the mobile display device (3) being configured to output, when displaying a defined item of near vehicle information and a defined operating menu for remote control of at least one near vehicle function, at the same time an audible information signal to the driver so that, by the audible information signal, the driver is reliably informed that relevant near vehicle information and relevant operating menus are now displayed by the display screen;
  the apparatus being configured to remotely control the at least one vehicle function based on a selection by the driver from the at least one operating menu for remote control;
  the apparatus being configured to, depending on the determined position of the mobile display device (3), block remote control of at least one vehicle function; and
  the apparatus being configured to, if the mobile display device (3) is located in a seating position within a defined proximity in a vicinity of the driver's seat, blocking the remote control of at least one vehicle function.

13. The method according to claim 1, wherein the vehicle is a commercial vehicle.

14. The apparatus according to claim 12, wherein the vehicle is a commercial vehicle.

* * * * *